(12) United States Patent
Ulbricht et al.

(10) Patent No.: US 11,783,552 B2
(45) Date of Patent: Oct. 10, 2023

(54) IDENTITY-BASED INCLUSION/EXCLUSION IN A COMPUTER-GENERATED REALITY EXPERIENCE

(71) Applicant: Apple Inc., Cupertino, CA (US)

(72) Inventors: Daniel Ulbricht, Sunnyvale, CA (US); Amit Kumar K C, Sunnyvale, CA (US); Angela Blechschmidt, San Jose, CA (US); Chen-Yu Lee, Sunnyvale, CA (US); Eshan Verma, Mountain View, CA (US); Mohammad Haris Baig, San Jose, CA (US); Tanmay Batra, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/557,805

(22) Filed: Dec. 21, 2021

(65) Prior Publication Data

US 2022/0114796 A1    Apr. 14, 2022

Related U.S. Application Data

(63) Continuation of application No. 17/149,949, filed on Jan. 15, 2021, now Pat. No. 11,295,529, which is a continuation of application No. 16/580,176, filed on Sep. 24, 2019, now Pat. No. 10,896,548.

(60) Provisional application No. 62/737,441, filed on Sep. 27, 2018.

(51) Int. Cl.
*G06T 19/00* (2011.01)
*G06F 3/01* (2006.01)
*A63F 13/825* (2014.01)
*G02B 27/01* (2006.01)
*A63F 13/212* (2014.01)
*G06F 3/03* (2006.01)

(52) U.S. Cl.
CPC .......... *G06T 19/006* (2013.01); *A63F 13/212* (2014.09); *A63F 13/825* (2014.09); *G02B 27/017* (2013.01); *G06F 3/011* (2013.01); *G06F 3/0304* (2013.01); *G06T 19/003* (2013.01)

(58) Field of Classification Search
None
See application file for complete search history.

(56) References Cited

U.S. PATENT DOCUMENTS

| | | | |
|---|---|---|---|
| 9,349,217 | B1 | 5/2016 | Worley, III et al. |
| 10,607,134 | B1 | 3/2020 | Cosic |
| 2002/0075201 | A1 | 6/2002 | Sauer et al. |
| 2010/0312734 | A1 | 12/2010 | Widrow |
| 2012/0142415 | A1 | 6/2012 | Lindsay |
| 2013/0002840 | A1 | 1/2013 | Toney et al. |

(Continued)

*Primary Examiner* — Frank S Chen
(74) *Attorney, Agent, or Firm* — Fernando & Partners, LLP (57) ABSTRACT

In one implementation, a method of including a person in a CGR experience or excluding the person from the CGR experience is performed by a device including one or more processors, non-transitory memory, and a scene camera. The method includes, while presenting a CGR experience, capturing an image of scene; detecting, in the image of the scene, a person; and determining an identity of the person. The method includes determining, based on the identity of the person, whether to include the person in the CGR experience or exclude the person from the CGR experience. The method includes presenting the CGR experience based on the determination.

22 Claims, 7 Drawing Sheets

(56) References Cited

U.S. PATENT DOCUMENTS

| | | | |
|---|---|---|---|
| 2013/0021373 A1* | 1/2013 | Vaught | G06F 3/013 345/633 |
| 2014/0006026 A1 | 1/2014 | Lamb et al. | |
| 2015/0278263 A1* | 10/2015 | Bowles | A63F 13/212 463/43 |
| 2016/0125656 A1 | 5/2016 | James et al. | |
| 2016/0187654 A1* | 6/2016 | Border | G02B 27/0172 359/630 |
| 2016/0292924 A1 | 10/2016 | Balachandreswaran et al. | |
| 2017/0011368 A1 | 1/2017 | Trombino | |
| 2017/0191800 A1* | 7/2017 | Fischer | F41J 5/02 |
| 2018/0357826 A1 | 12/2018 | Ross et al. | |
| 2019/0122027 A1 | 4/2019 | Prideaux-Ghee et al. | |
| 2019/0279428 A1* | 9/2019 | Mack | G06T 7/90 |
| 2019/0320138 A1* | 10/2019 | Kaufthal | G06V 40/168 |
| 2020/0050206 A1 | 2/2020 | Deyle et al. | |
| 2020/0215410 A1 | 7/2020 | Li et al. | |
| 2021/0248358 A1 | 8/2021 | Lee | |

* cited by examiner

While presenting a CGR experience, capturing an image of a scene — 610

While presenting the CGR experience, detecting, in the image of the scene, a person — 620

While presenting the CGR experience, determining an identity of the person — 630

Determining, based on the identity of the person, whether to include the person in the CGR experience or exclude the person from the CGR experience — 640

Present the CGR experience based on the determination — 650

Figure 6

IDENTITY-BASED INCLUSION/EXCLUSION IN A COMPUTER-GENERATED REALITY EXPERIENCE

CROSS-REFERENCE TO RELATED APPLICATIONS

This application is a continuation of U.S. Non-Provisional patent application Ser. No. 17/149,949, filed on Jan. 15, 2021, which is a continuation of U.S. Non-Provisional patent application Ser. No. 16/580,176, filed on Sep. 24, 2019, which claims priority to U.S. Provisional Patent App. No. 62/737,441, filed on Sep. 27, 2018, each of which is hereby incorporated by reference in their entirety.

TECHNICAL FIELD

The present disclosure generally relates to generating including or excluding people from a computer-generated reality experience, and in particular, to systems, methods, and devices for including or excluding people from a computer-generated reality experience based on their identity.

BACKGROUND

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment. In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

While a device is presenting a CGR experience to a user in an environment, representations of people within the physical environment may be altered. For example, in a multiplayer gaming experience, people other than the user may be presented as monsters or donning battle armor. However, in various circumstances, it may be undesirable for all people to be included in the CGR experience. For example, it may be undesirable for a user's children or safety personnel to be displayed in an altered manner. Accordingly, to improve the CGR experience, various implementations disclosed herein determine the identity of a person detected in the environment and include or exclude the person based on the identity.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for including a person in a CGR experience or excluding a person from a CGR experience based on the identity of the person. In various implementations, the method is performed at a device including one or more processors, non-transitory memory, and a scene camera. The method includes, while presenting a CGR experience, capturing an image of scene; detecting, in the image of the scene, a person; and determining an identity of the person. The method includes determining, based on the identity of the person, whether to include the person in the CGR experience or exclude the person from the CGR experience. The method includes presenting the CGR experience based on the determination.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

As noted above, while a device is presenting a CGR experience to a user in an environment, representations of people within the environment may be altered. However, in various circumstances, it may be undesirable for all people to be included in the CGR experience. Accordingly, to improve the CGR experience, various implementations disclosed herein determine the identity of a person detected in the environment and include or exclude the person based on the identity.

Figure 1:
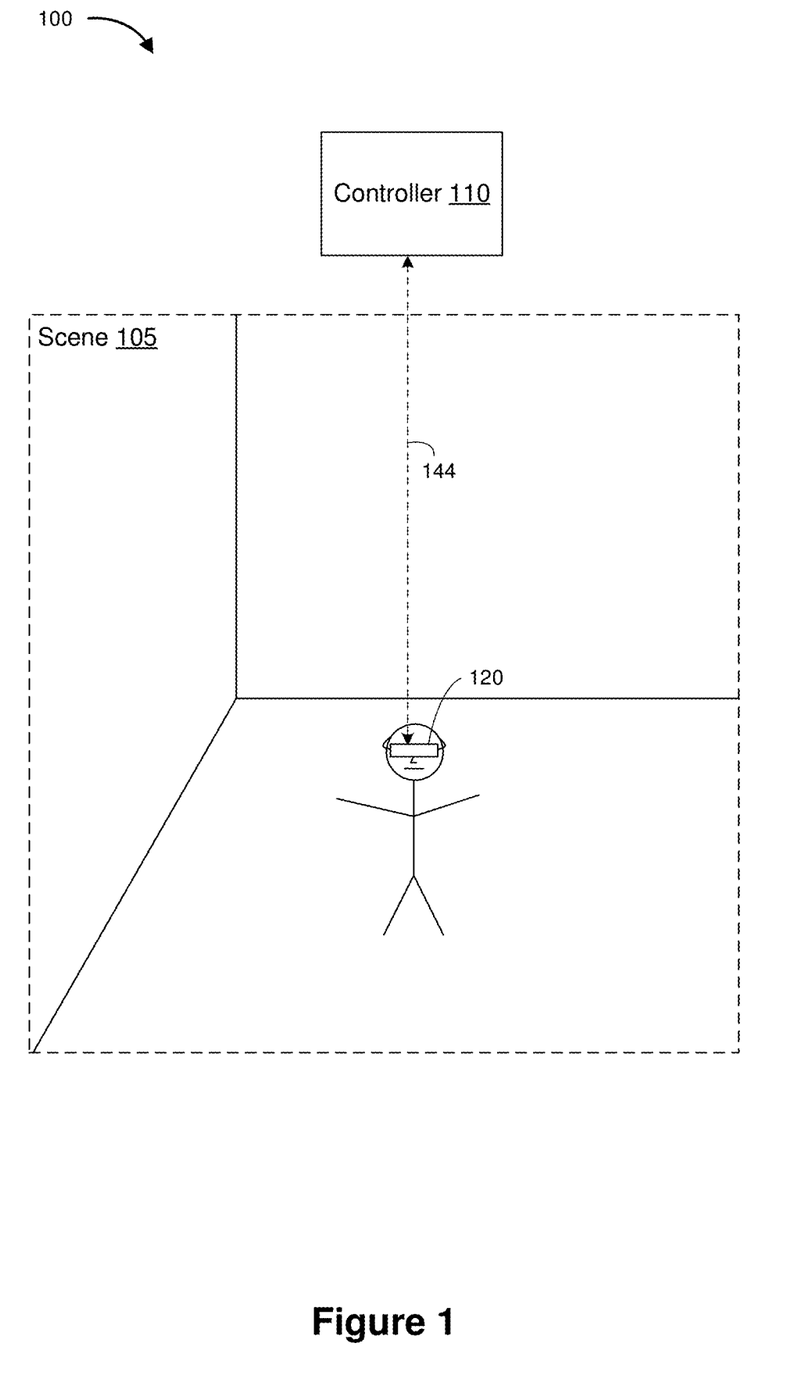
FIG. 1 is a block diagram of an example operating environment in accordance with some implementations.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an HMD 120.

In some implementations, the controller 110 is configured to manage and coordinate a CGR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In various implementations, the scene 105 is a physical environment. In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.). In another example, the controller 110 is included within the enclosure of HMD 120.

In some implementations, the HMD 120 is configured to provide the CGR experience to the user. In some implementations, the HMD 120 includes a suitable combination of software, firmware, and/or hardware. The HMD 120 is described in greater detail below with respect to FIG. 3. In some implementations, the functionalities of the controller 110 are provided by and/or combined with the HMD 120.

According to some implementations, the HMD 120 provides a CGR experience to the user while the user is virtually and/or physically present within the scene 105. In some implementations, while presenting an AR experience, the HMD 120 is configured to present AR content (e.g., one or more virtual objects) and to enable optical see-through of the scene 105. In some implementations, while presenting an AR experience, the HMD 120 is configured to present AR content (e.g., one or more virtual objects) overlaid or otherwise combined with images or portions thereof captured by the scene camera of HMD 120. In some implementations, while presenting AV content, the HMD 120 is configured to present elements of the real world, or representations thereof, combined with or superimposed over a user's view of a computer-simulated environment. In some implementations, while presenting a VR experience, the HMD 120 is configured to present VR content.

In some implementations, the user wears the HMD 120 on his/her head. As such, the HMD 120 includes one or more CGR displays provided to display the CGR content. For example, in various implementations, the HMD 120 encloses the field-of-view of the user. In some implementations, the HMD 120 is replaced with a handheld device (such as a smartphone or tablet) configured to present CGR content, and rather than wearing the HMD 120 the user holds the device with a display directed towards the field-of-view of the user and a camera directed towards the scene 105. In some implementations, the handheld device can be placed within an enclosure that can be worn on the head of the user. In some implementations, the HMD 120 is replaced with a CGR chamber, enclosure, or room configured to present CGR content in which the user does not wear or hold the HMD 120.

Figure 2:
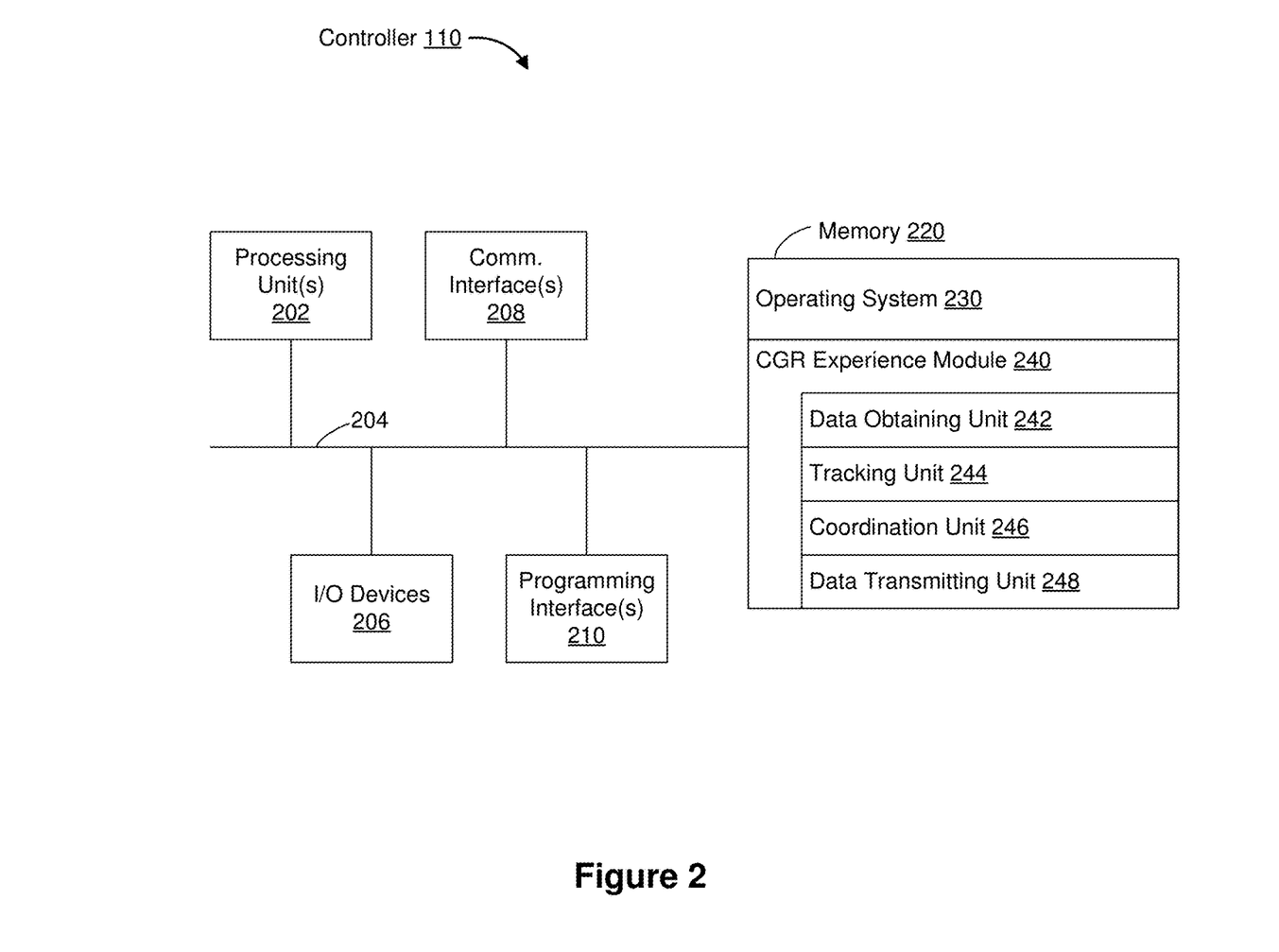
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a CGR experience module 240.

The operating system 230 includes procedures for handling various basic system services and for performing hardware dependent tasks. In some implementations, the CGR experience module 240 is configured to manage and coordinate one or more CGR experiences for one or more users (e.g., a single CGR experience for one or more users, or multiple CGR experiences for respective groups of one or more users). To that end, in various implementations, the CGR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120. To that end, in various implementations, the data obtaining unit 242 includes instructions and/or logic therefor, and heuristics and metadata therefor.

In some implementations, the tracking unit 244 is configured to map the scene 105 and to track the position/location of at least the HMD 120 with respect to the scene 105. To that end, in various implementations, the tracking unit 244 includes instructions and/or logic therefor, and heuristics and metadata therefor.

In some implementations, the coordination unit 246 is configured to manage and coordinate the CGR experience presented to the user by the HMD 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
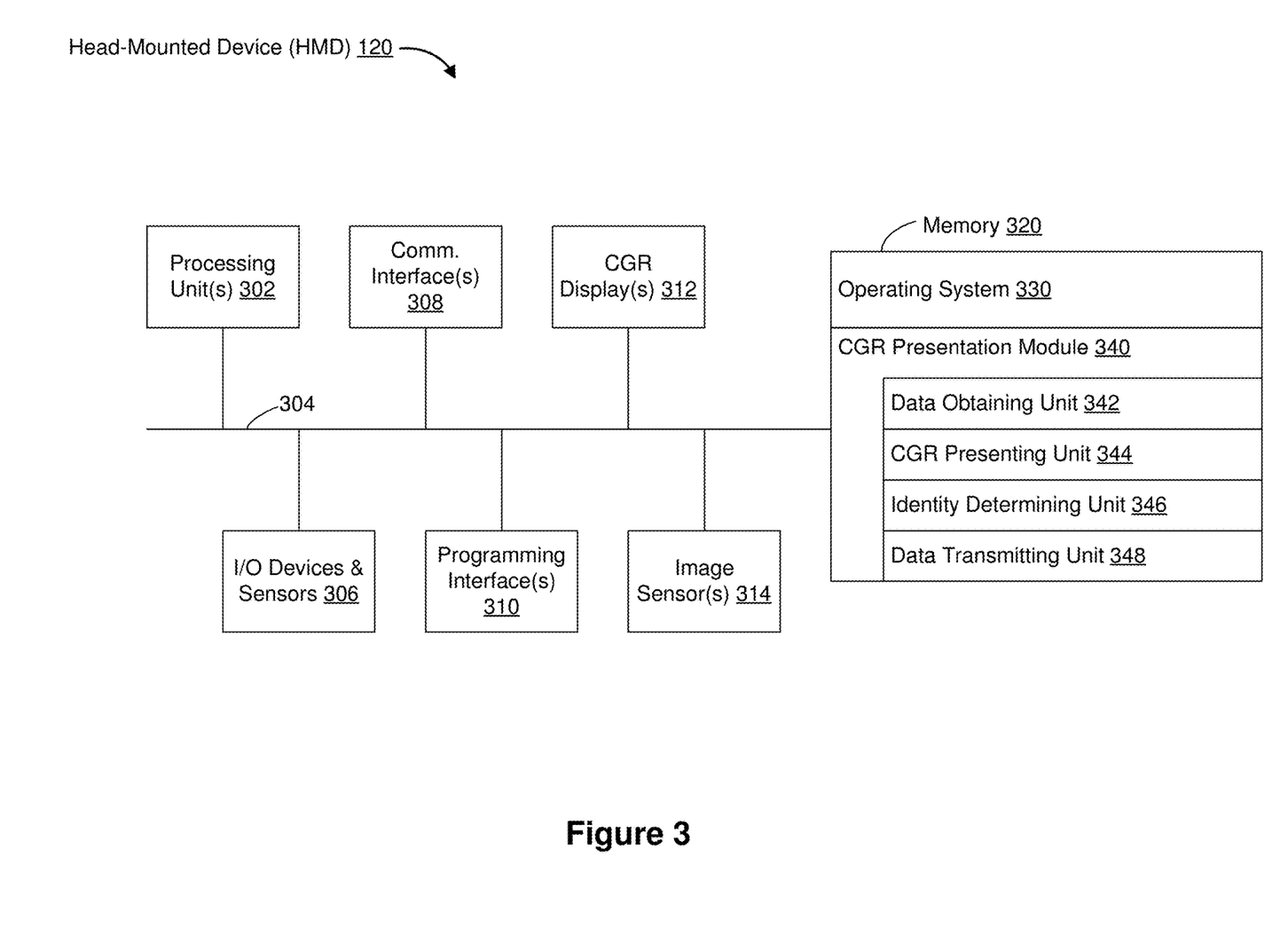
FIG. 3 is a block diagram of an example HMD in accordance with some implementations.

FIG. 3 is a block diagram of an example of the HMD 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior and/or exterior facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more CGR displays 312 are configured to provide the CGR experience to the user. In some implementations, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some implementations, the one or more CGR displays 312 are capable of presenting AR and VR content. In some implementations, the one or more CGR displays 312 are capable of presenting AR or VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR presentation module 340.

The operating system 330 includes procedures for handling various basic system services and for performing hardware dependent tasks. In some implementations, the CGR presentation module 340 is configured to present CGR content to the user via the one or more CGR displays 312. To that end, in various implementations, the CGR presentation module 340 includes a data obtaining unit 342, a CGR presenting unit 344, an identity determining unit 346, and a data transmitting unit 348.

In some implementations, the data obtaining unit 342 is configured to obtain data (e.g., presentation data, interaction data, sensor data, location data, etc.) from at least the controller 110. To that end, in various implementations, the data obtaining unit 342 includes instructions and/or logic therefor, and heuristics and metadata therefor.

In some implementations, the CGR presenting unit 344 is configured to present CGR content via the one or more CGR displays 312. To that end, in various implementations, the CGR presenting unit 344 includes instructions and/or logic therefor, and heuristics and metadata therefor.

In some implementations, the identity determining unit 346 is configured to detect a person in an image of the scene and determine the identity of the person. To that end, in various implementations, the identity determining unit 346 includes instructions and/or logic therefor, and heuristics and metadata therefor. In various implementations, the CGR presenting unit 344 is configured to present the CGR content based on the determined identity.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the CGR presenting unit 344, the identity determining unit 346, and the data transmitting unit 348 are shown as residing on a single device (e.g., the HMD 120), it should be understood that in other implementations, any combination of the data obtaining unit 342, the CGR presenting unit 344, the identity determining unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
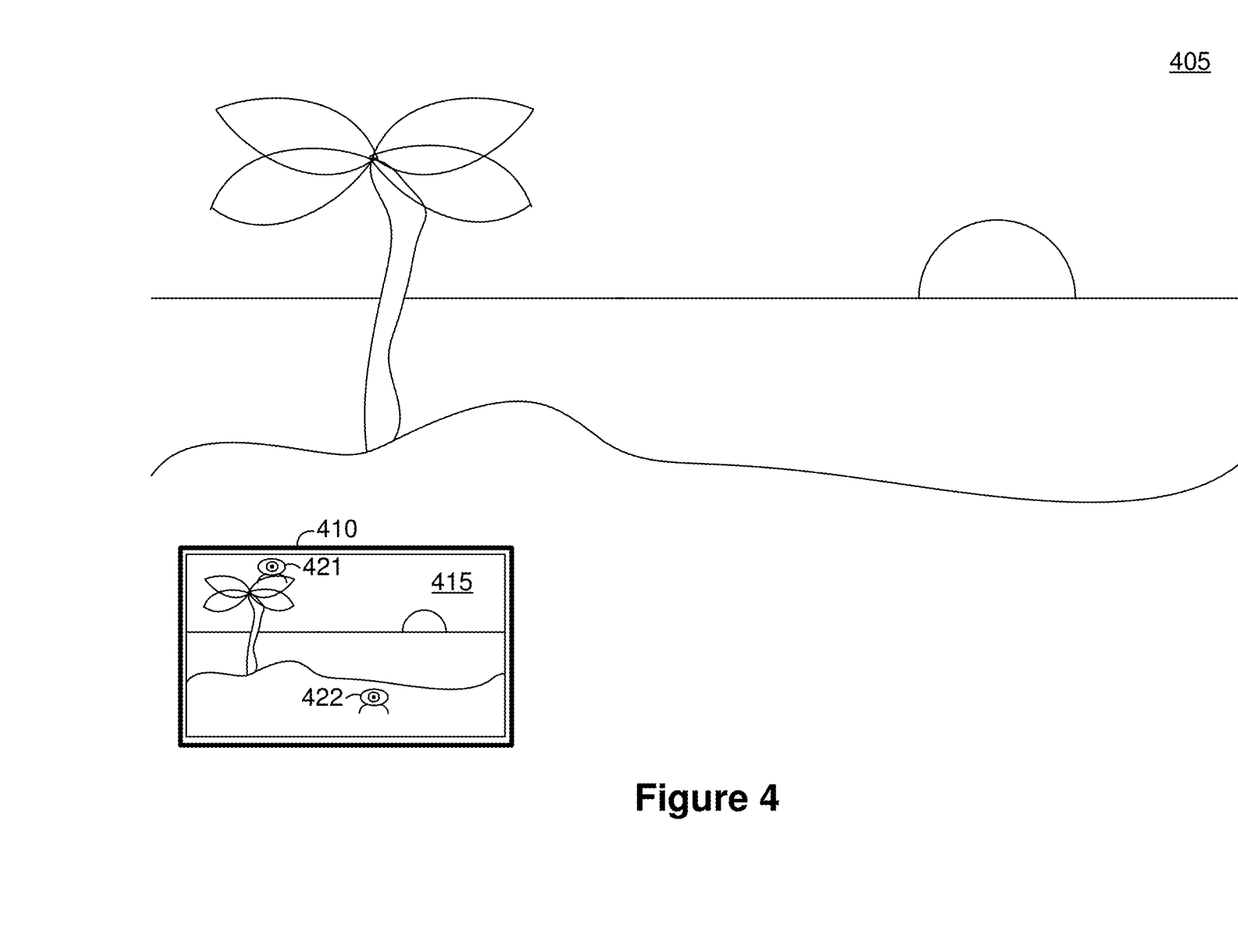
FIG. 4 illustrates a scene with a handheld electronic device surveying the scene.

FIG. 4 illustrates a scene 405 with an electronic device 410 (e.g., HMD 120 or other electronic device) surveying the scene 405. The electronic device 410 displays, on a display, a representation 415 of the scene 405. In various implementations, the representation 415 of the scene 405 is generated based on an image of the scene 405 captured with a scene camera of the electronic device 410 having a field-of-view directed toward the scene 405.

In FIG. 4, the electronic device 410 is presenting a CGR experience. Accordingly, the representation 415 of the scene 405 includes representations of virtual objects 421, 422 in addition to representations of real objects present in the scene 405 (such as the tree, the sun, and the sand).

Figure 5A:
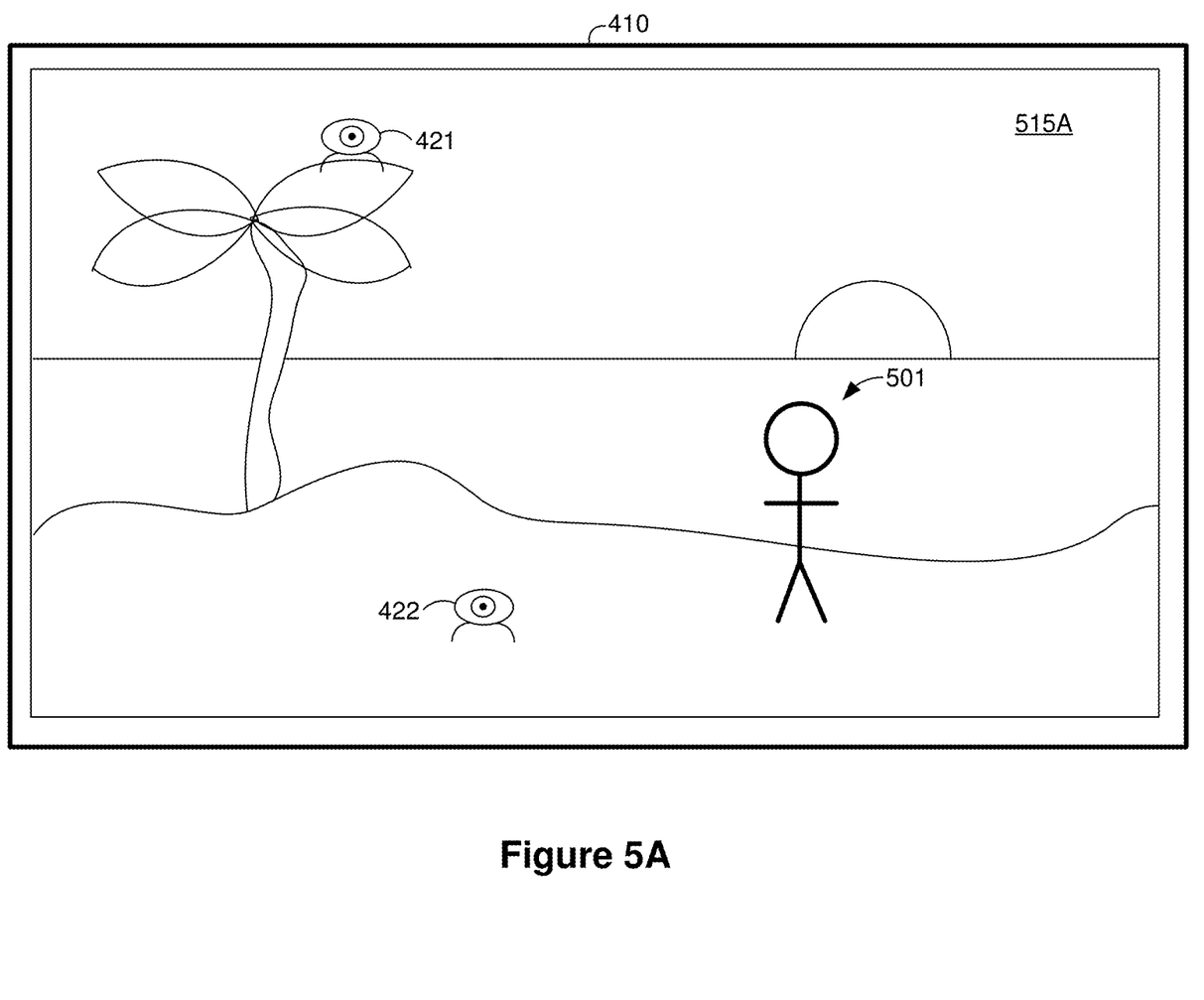
FIG. 5A illustrates the electronic device of FIG. 4 displaying a first representation of the scene at a first time in which a first person has entered the scene.

FIG. 5A illustrates the electronic device 410 displaying a first representation 515A of the scene 405 at a first time in which a first person 501 has entered the scene 405. The electronic device 410 detects the first person 501 in a captured image of the scene 405 and determines a first identity of the first person 501.

In various implementations, the first person 501 is detected using an object detection/classification algorithm applied to the image of the scene 405. In various implementations, the first person 501 is detected by applying a neural network to the image of the scene 405. In various implementations, the neural network includes an interconnected group of nodes. In various implementation, each node includes an artificial neuron that implements a mathematical function in which each input value is weighted according to a set of weights and the sum of the weighted inputs is passed through an activation function, typically a non-linear function such as a sigmoid, piecewise linear function, or step function, to produce an output value. In various implementations, the neural network is trained on training data to set the weights.

In various implementations, the neural network includes a deep learning neural network. Accordingly, in some implementations, the neural network includes a plurality of layers (of nodes) between an input layer (of nodes) and an output layer (of nodes). In various implementations, the neural network receives, as inputs, the image of the scene. In various implementations, the neural network provides, as outputs, a pixel set indicating which pixels of the image correspond to a representation of a person.

In various implementations, the first identity of the first person 501 is determined by applying a classifier to the pixels of the pixel set. In various implementations, the classifier is an exemplar SVM (support vector machine). In various implementations, the classifier is provided with a positive image of a particular person and generates a feature vector by comparing the positive image to many other negative images of many other people (e.g., thousands of images from a library). Thus, in various implementations, the classifier receives, as an input, an image (or a portion thereof) of a detected person and provides, as an output, an identity of the person (or an indication that the identity is unknown).

In some embodiments, the classifier is trained on-the-fly (e.g., while the electronic device 410 is presenting the CGR experience). For example, in some implementations, upon detecting a person and classifying the person as having an unknown identity, the electronic device 410 prompts the user to identify the person and indicate whether to include the person in the CGR experience or exclude the person from the CGR experience.

In FIG. 5A, the first person 501 is excluded from the CGR experience. Thus, in various implementations (and as shown in FIG. 5A), an unaltered representation of the person (e.g., as captured by the scene camera) is displayed. In various implementations, a person excluded from the CGR experience is removed from the image captured by the scene camera and no representation of the person is displayed.

In various implementations, the electronic device 410 excludes the first person 501 from the CGR experience in response to determining that the identity of the person is on a blacklist of identities to exclude from the CGR experience. In various implementations, the electronic device 410 excludes the first person 501 from the CGR experience in response to determining that the identity of the person is not on a whitelist of identities to include in the CGR experience.

Figure 5B:
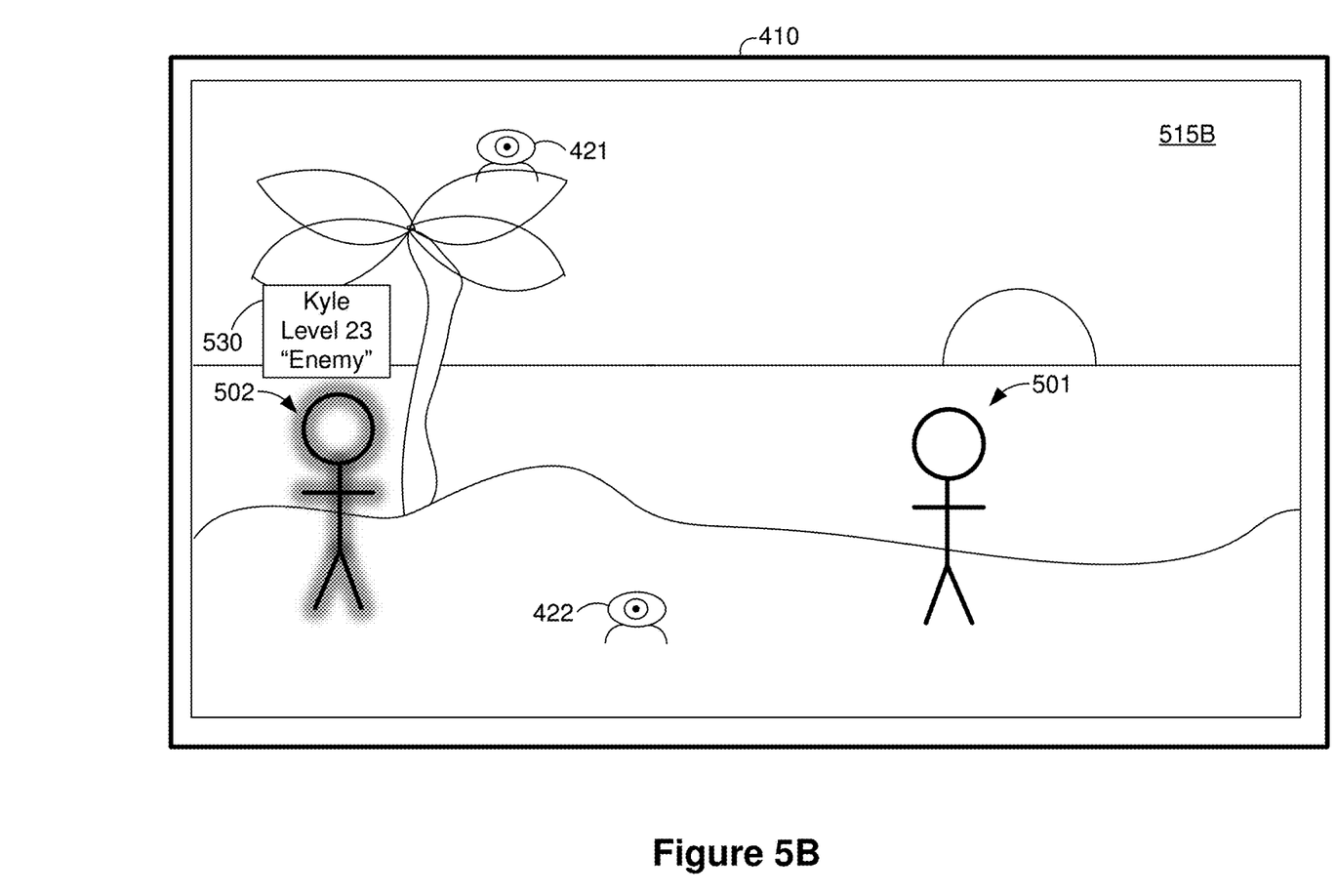
FIG. 5B illustrates the electronic device of FIG. 4 displaying a second representation of the scene at a second time in which a second person has entered the scene.

FIG. 5B illustrates the electronic device 410 displaying a second representation 515B of the scene 405 at a second time in which a second person 502 has entered the scene 405. The electronic device 410 detects the second person 502 in an image of the scene 405 and determines an identity of the second person 502.

In FIG. 5B, the second person 502 is included in the CGR experience. In various implementations (and as shown in FIG. 5B), the second person 502 is displayed with an inclusion indicia. For example, in FIG. 5B, an altered representation of the second person 502 is displayed. In various implementations, an included person is displayed as a monster, with battle armor, or with a colored outline (as in FIG. 5B). In various implementations (and as also shown in FIG. 5B), the inclusion indicia includes a pop-up window 530 displayed in association with the representation of the person including data regarding the person and/or an avatar of the person. For example, in FIG. 5B, the pop-up window 530 includes a name (or alias) of the person, a level of the person within the CGR experience, and an indication that the person is an "enemy" within the CGR experience.

In various implementations, the electronic device 410 alters audio generated by a person included in the CGR experience. For example, in various implementations, the electronic device 410 processes sound generated by the person (e.g., spoken words) by adding reverb or making the person's voice sound as though coming from a walkie-talkie.

In various implementations, the electronic device 410 includes the second person 502 in the CGR experience in response to determining that the identity of the person is on a whitelist of identities to include in the CGR experience. In various implementations, the electronic device 410 includes the second person 502 in the CGR experience in response to determining that the identity of the person is not on a blacklist of identities to exclude from the CGR experience.

Thus, as illustrated in FIG. 5B, multiple people can be detected in an image of the scene and the electronic device 410 simultaneously includes one or more of the people in the CGR experience and excludes one or more of the people from the CGR experience. For example, in FIG. 5B, the first person 501 is excluded from the CGR experience and the second person 502 is included in the CGR experience.

Figure 6:
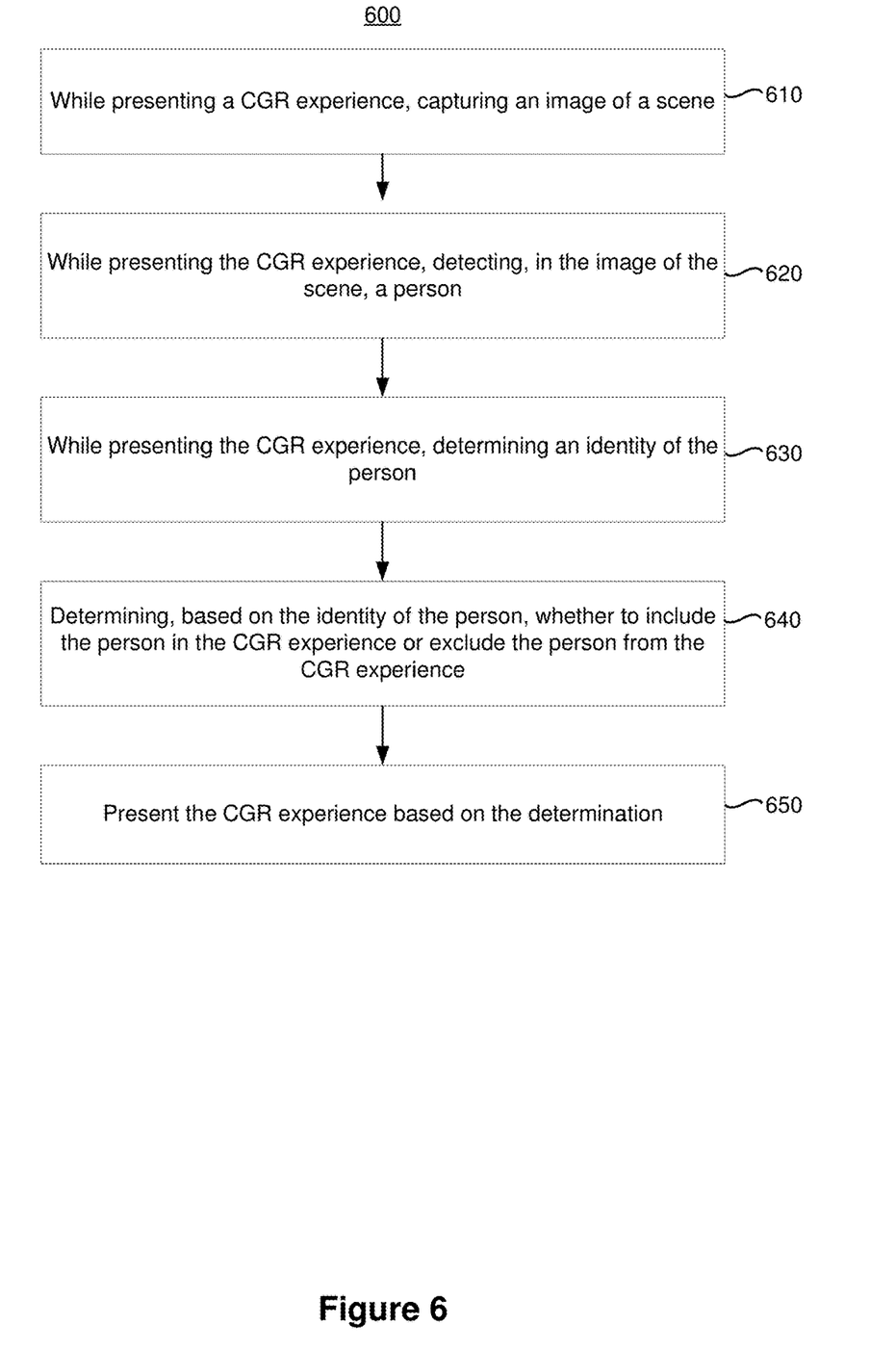
FIG. 6 is a flowchart representation of a method of including a person in a CGR experience or excluding the person from the CGR experience in accordance with some implementations.

FIG. 6 is a flowchart representation of a method 600 of including or excluding a person while presenting a CGR experience in accordance with some implementations. In various implementations, the method 600 is performed by a device with one or more processors, non-transitory memory, and a scene camera (e.g., the HMD 120 FIG. 3 or device 410 as described with respect to FIGS. 4 and 5A-5B). In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory). Briefly, in some circumstances, the method 600 includes: determining, based on a determined identity of a person detected in a captured image of scene, whether to include a person in a CGR experience or exclude the person from the CGR experience and presenting the CGR experience based on the determination.

The method 600 begins, in block 610, with the device, while presenting a CGR experience, capturing an image of a scene. In various implementations, the image of the scene is captured with a scene camera. In various implementations, the image of the scene includes a plurality of pixels having a respective plurality of pixel values.

In various implementations, presenting the CGR experience includes providing pass-through imagery of the scene with one or more virtual objects displayed over or composited with the pass-through imagery. For example, FIGS. 4 and 5A-5B illustrate an electronic device 410 presenting a CGR experience.

The method 600 continues, in block 620, with the device detecting, in the image of the scene, a person. For example, in FIG. 5A, the electronic device 410 detects a first person 501 and in FIG. 5B, the electronic device 410 detects a second person 502. In various implementations, the person is detected using an object detection/classification algorithm applied to the image of the scene. In various implementations, the person is detected by applying an object detecting neural network to the image of the scene to generate a pixel set corresponding to the person. For example, the object detecting neural network receives, as an input, the image of the scene and provides, as an output, a pixel set comprising a set of pixel locations of pixels of the image of the scene corresponding to a representation of the person.

In various implementations, the pixel set is cropped to a reduced pixel set in order to reduce noise. For example, in various implementations, the pixel set is cropped to a face region of the person based on a face detection algorithm.

The method 600 continues, in block 630, with the device determining an identity of the person. In various implementations, the device determines the identity of the person based on facial features of the person, a silhouette of the person, a motion pattern of the person, depth information (e.g., from a depth sensor or VIO algorithm) corresponding to distances between the scene camera and various points of the person. In various implementations, the device determines the identity of the person based on a pixel set of the image corresponding to a representation of the person in the image.

In various implementations, the device determines the identity of the person by applying a classifier to at least a portion of the image (e.g., a pixel set output by an object detection and/or classification algorithm).

In various implementations, the device determines the identity based on feedback received from a user. For example, if the identity of the person is unknown based on a classifier, the device prompts the user for an identity of the person, thus training the classifier. When the person is next encountered, the device determines the identity of the person based on the classifier. Thus, in various implementations, determining the identity of the person includes determining that the identity of the person is unknown by the classifier, receiving feedback from a user indicative of the identity of the person, and training the classifier based on the feedback. In various implementations, this is performed "on-the-fly", e.g., while presenting the CGR experience.

The method 600 continues, in block 640, with the device determining, based on the identity of the person, whether to include the person in the CGR experience or exclude the person from the CGR experience. In various implementations, determining whether to include the person in the CGR experience or exclude the person from the CGR experience is based on a whitelist of identities to include in the CGR experience. In various implementations, determining whether to include the person in the CGR experience or exclude the person from the CGR experience is based on a blacklist of identities to exclude from the CGR experience.

The method 600 continues, in block 650, with the device presenting the CGR experience based on the determination. In various implementations, presenting the CGR experience based on the determination includes including the person in the CGR experience. For example, in FIG. 5B, the electronic device 410 presents the CGR experience including the second person 502 in the CGR experience. Thus, in various implementations, the device includes the person in the CGR experience by displaying a representation of the person with an inclusion indicia. In various implementations, displaying the representation of the person with the inclusion indicia includes displaying an altered representation of the person (e.g., as a monster, with battle armor, with a colored outline) or displaying a pop-up near the representation of the person (e.g., the name/alias of the person, whether "friend" or "foe" in a game, etc.). In various implementations, including the person in the CGR experience includes altering audio generated by the person.

In various implementations, presenting the CGR experience based on the determination includes excluding the person from the CGR experience. For example, in FIG. 5A, the electronic device 410 presents the CGR experience excluding the first person 501 from the CGR experience. Thus, in various implementations, the device excludes the person from the CGR experience by displaying an unaltered representation of the person. Thus, in various implementations, the excluded person is displayed as captured in the image of the scene. In various implementations, the device excludes the person from the CGR experience by not displaying a representation of the person. Thus, in various implementations, the device removes the person from the image of the scene.

In various implementations, while presenting the CGR experience, the device detects multiple people in the image of the scene (in block 620), determines a respective identity of each of the multiple people (in block 630), and determines, for each of the multiple people, whether to include or exclude the person (in block 640), and presents the CGR experience (in block 650) based on the determinations. Accordingly, in various implementations, the device simultaneously includes one or more of the multiple people in the CGR experience and excludes one or more of the multiple people in the CGR experience.

Thus, the method 600 presents a CGR experience in which people are selectively included or excluded based on their identity. Accordingly, the method 600 allows for some people to be included in the CGR experience without including all people in the CGR experience, which may be undesirable or unsafe.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is truer]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at an electronic device including one or more processors, non-transitory memory, a scene camera, one or more microphones, one or more speakers, and a display:
      while presenting a computer-generated reality (CGR) experience via the display, capturing, via the scene camera, an image of a physical environment;
      detecting a person within the image of the physical environment; and
      in response to detecting the person within the image of the physical environment:
         capturing, via the one or more microphones, audio content from the person;
         altering the captured audio content from the person and providing the altered audio content, via the one or more speakers, according to a determination that an identity of the person is included among the list of identities; and
         providing the captured audio content from the person, via the one or more speakers, according to a determination that the identity of the person is not included among the list of identities.

2. The method of claim 1, further comprising:
in response to detecting the person within the image of the physical environment:
- presenting, via the display, an avatar of the person within the CGR experience according to the determination that the identity of the person is included among the list of identities, wherein the avatar for the person that is different from an appearance of the person detected within the image of the physical environment; and
- presenting, via the display, an unaltered version of the person within the CGR experience according to the determination that the identity of the person is not included among the list of identities, wherein the unaltered version of the person corresponds to the appearance of the person detected within the image of the physical environment.

3. The method of claim 1, further comprising:
in response to detecting the person within the image of the physical environment:
- presenting, via the display, a representation of the person within the CGR experience according to the determination that the identity of the person is included among the list of identities; and
- forgoing, via the display, presentation of the representation of the person within the CGR experience according to the determination that the identity of the person is not included among the list of identities.

4. The method of claim 3, further comprising:
presenting, via the display, an inclusion indicia adjacent to the representation of the person according to the determination that the identity of the person is included among the list of identities.

5. The method of claim 1, further comprising:
presenting, via the display, data associated with the person according to the determination that the identity of the person is included among the list of identities.

6. The method of claim 1, wherein detecting the person includes applying an object detecting neural network to the image of the physical environment to generate a pixel set corresponding to a representation of the person and wherein determining the identity of the person is based on the pixel set.

7. The method of claim 1, further comprising:
determining the identity of the person within the image of the physical environment.

8. The method of claim 7, wherein determining the identity of the person is based on detected facial features of the person.

9. The method of claim 7, wherein determining the identity of the person includes applying a classifier to at least a portion of the image of the physical environment.

10. The method of claim 9, further comprising:
- determining whether the classifier generates the identity for the person within the image of the physical environment; and
- in accordance with a determination that the classifier cannot generate the identity for the person within the image of the physical environment:
  - presenting, via the display, a notification prompting a user of the electronic device to provide the identity for the person within the image of the physical environment; and
  - updating the classifier based on a response to the notification.

11. A device comprising:
- a scene camera;
- a display;
- one or more microphones;
- one or more speakers;
- one or more processors;
- a non-transitory memory; and
- one or more programs stored in the non-transitory memory, which, when executed by the one or more processors, cause the device to:
  - while presenting a computer-generated reality (CGR) experience via the display, capture, via the scene camera, an image of a physical environment;
  - detecting a person within the image of the physical environment; and
  - in response to detecting the person within the image of the physical environment:
    - capture, via the one or more microphones, audio content from the person;
    - alter the captured audio content from the person and provide the altered audio content, via the one or more speakers, according to a determination that an identity of the person is included among the list of identities; and
    - provide the captured audio content from the person, via the one or more speakers, according to a determination that the identity of the person is not included among the list of identities.

12. The device of claim 11, wherein the one or more programs further cause the device to:
in response to detecting the person within the image of the physical environment:
- present, via the display, an avatar of the person within the CGR experience according to the determination that the identity of the person is included among the list of identities, wherein the avatar for the person that is different from an appearance of the person detected within the image of the physical environment; and
- present, via the display, an unaltered version of the person within the CGR experience according to the determination that the identity of the person is not included among the list of identities, wherein the unaltered version of the person corresponds to the appearance of the person detected within the image of the physical environment.

13. The device of claim 11, wherein the one or more programs further cause the device to:
in response to detecting the person within the image of the physical environment:
- present, via the display, a representation of the person within the CGR experience according to the determination that the identity of the person is included among the list of identities; and
- forgo, via the display, presentation of the representation of the person within the CGR experience according to the determination that the identity of the person is not included among the list of identities.

14. The device of claim 13, wherein the one or more programs further cause the device to:
present, via the display, an inclusion indicia adjacent to the representation of the person according to the determination that the identity of the person is included among the list of identities.

15. The device of claim 11, wherein the one or more programs further cause the device to:
  present, via the display, data associated with the person according to the determination that the identity of the person is included among the list of identities.

16. The device of claim 11, wherein the one or more programs further cause the device to:
  determine the identity of the person within the image of the physical environment, wherein determining the identity of the person is based on at least one of detecting facial features of the person or applying a classifier to at least a portion of the image of the physical environment.

17. A non-transitory memory storing one or more programs, which, when executed by one or more processors of a device with a scene camera, one or more microphones, one or more speakers, and a display, cause the device to:
  while presenting a computer-generated reality (CGR) experience via the display, capture, via the scene camera, an image of a physical environment;
  detecting a person within the image of the physical environment; and
  in response to detecting the person within the image of the physical environment:
    capture, via the one or more microphones, audio content from the person;
    alter the captured audio content from the person and provide the altered audio content, via the one or more speakers, according to a determination that an identity of the person is included among the list of identities; and
    provide the captured audio content from the person, via the one or more speakers, according to a determination that the identity of the person is not included among the list of identities.

18. The non-transitory memory of claim 17, wherein the one or more programs further cause the device to:
  in response to detecting the person within the image of the physical environment:
    present, via the display, an avatar of the person within the CGR experience according to the determination that the identity of the person is included among the list of identities, wherein the avatar for the person that is different from an appearance of the person detected within the image of the physical environment; and
    present, via the display, an unaltered version of the person within the CGR experience according to the determination that the identity of the person is not included among the list of identities, wherein the unaltered version of the person corresponds to the appearance of the person detected within the image of the physical environment.

19. The non-transitory memory of claim 17, wherein the one or more programs further cause the device to:
  in response to detecting the person within the image of the physical environment:
    present, via the display, a representation of the person within the CGR experience according to the determination that the identity of the person is included among the list of identities; and
    forgo, via the display, presentation of the representation of the person within the CGR experience according to the determination that the identity of the person is not included among the list of identities.

20. The non-transitory memory of claim 19, wherein the one or more programs further cause the device to:
  present, via the display, an inclusion indicia adjacent to the representation of the person according to the determination that the identity of the person is included among the list of identities.

21. The non-transitory memory of claim 17, wherein the one or more programs further cause the device to:
  present, via the display, data associated with the person according to the determination that the identity of the person is included among the list of identities.

22. The non-transitory memory of claim 17, wherein the one or more programs further cause the device to:
  determine the identity of the person within the image of the physical environment, wherein determining the identity of the person is based on at least one of detecting facial features of the person or applying a classifier to at least a portion of the image of the physical environment.

* * * * *